April 23, 1929.    J. W. LORIMER    1,710,425
FLYWHEEL BRAKING APPARATUS
Filed July 20, 1927
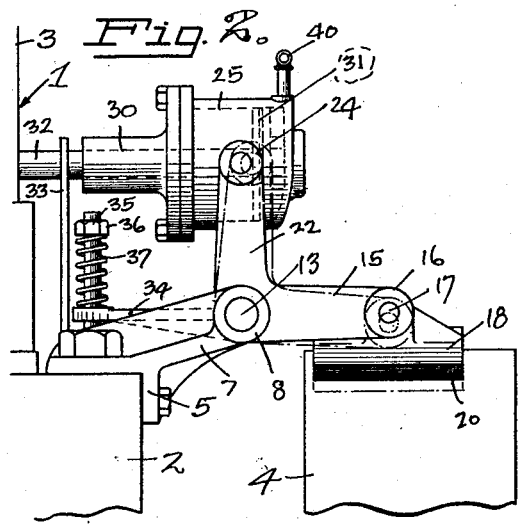
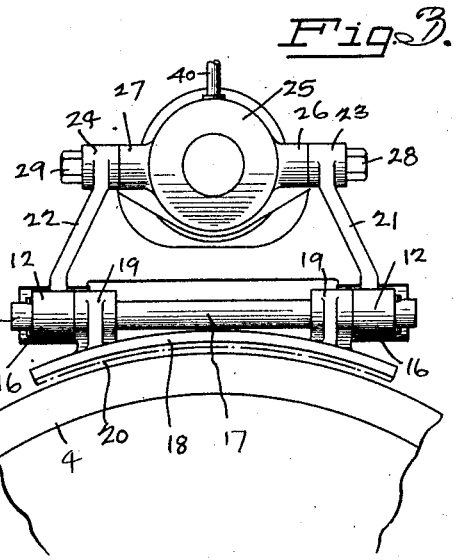
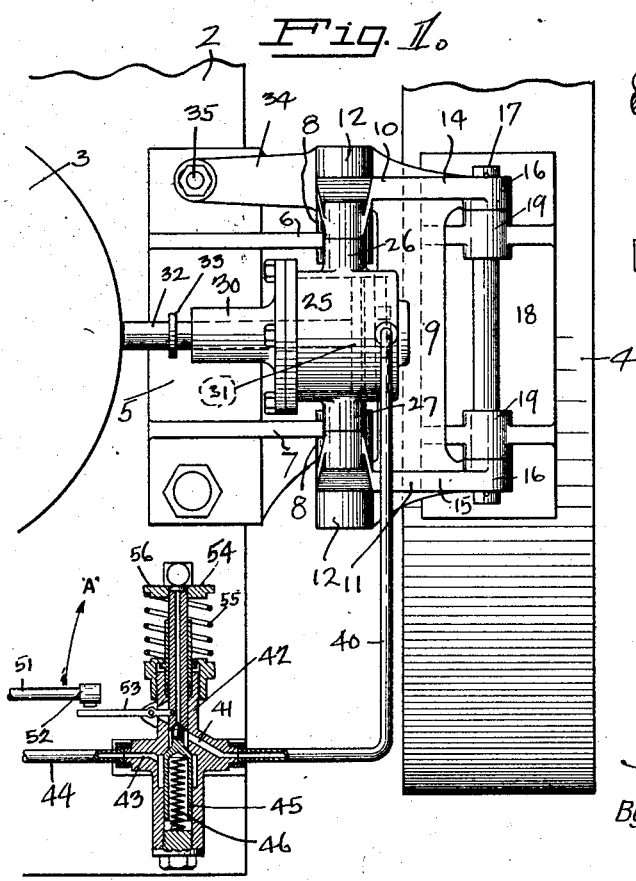
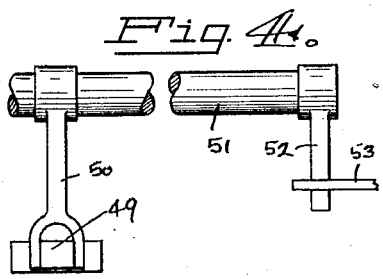
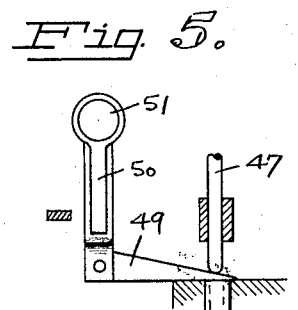
INVENTOR
JOHN W. LORIMER
By *Lincoln Johnson*
Attorney.

Patented Apr. 23, 1929.

1,710,425

UNITED STATES PATENT OFFICE.

JOHN W. LORIMER, OF OAKLAND, CALIFORNIA.

FLYWHEEL BRAKING APPARATUS.

Application filed July 20, 1927. Serial No. 207,206.

This invention relates particularly to a braking apparatus for retarding the rotation of a revolving element.

An object of the invention is to provide a pneumatically actuated braking apparatus for a rotatable element, particularly adapted to retarding the rotation of the fly wheel on an engine.

A further object of the invention is to provide a braking apparatus for a rotatable element mounted in movable relationship thereto, and adapted to be actuated by pneumatic means into and from contacting relationship with the rotatable element.

A still further object of the invention is to provide a braking apparatus, for an engine fly wheel, having pneumatic means for applying braking pressure to the said fly wheel controlled by a valve that is synchronized to operate with the engine, whereby when the engine controlling apparatus is moved to stop the operation of the engine, said controlling apparatus will automatically direct pressure to the braking apparatus to apply said braking apparatus to the engine fly wheel and thereby stop rotation thereof.

Other objects of the invention are to provide a braking apparatus for engine fly wheels that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying one sheet of drawings

Fig. 1 represents a plan view of a fragmentary portion of an engine and engine fly wheel having a braking appratus and control valve therefor mounted thereon, in accordance with the construction and arrangement of my invention.

Fig. 2 is a side elevation of Fig. 1.

Fig. 3 is an end view of Fig. 2.

Fig. 4 is an enlarged fragmentary view of a portion of the engine controlling mechanism to show an arm thereon for actuating the valve controlling the flow of pressure to and from the braking apparatus.

Fig. 5 is a front elevation of the apparatus shown in Fig. 4.

A great deal of time is lost in reversing the direction of rotation of propulsion apparatuses of the internal combustion type, due to the fact that momentum of rotation continues after the power generating means has stopped functioning. In marine vessels, the propeller shaft is usually directly connected to the engine crank shaft, so that any forward or rearward momentum of the vessel, with its pitched propeller blade thereon, causes said blade to move in the relatively stationary water and the pitch of said propeller blade causes it to be automatically rotated, thereby preventing the engine from coming to a quick stop. Where the engine is equipped with a reversing gear, there is, of course, no necessity for reversing the direction of operation of the engine, for obtaining either forward or rearward movement of the vessel, although my braking apparatus can be applied to such an engine for bringing it to a quick stop. My invention is particularly adapted to an internal combustion engine of the Diesel type, which may be operated with equal facility in either a forward or reverse direction. A vessel equipped with an engine having my braking apparatus thereon may thus be controlled in its forward or reverse movements without any loss of time and to eliminate the possibility of the vessel moving, forwardly or backwardly, uncontrolled by the vessel operator during periods when a change in the direction of rotation of the engine is being effected. I have found that my braking apparatus will bring an engine from a full speed operating position to a "dead-stop" in two or three seconds' time, so that the rotation of the engine in an opposite direction may be commenced immediately, whereas, without the braking apparatus, the period of time to allow the engine to come to a stop, of its own accord, may vary anywhere from fifteen to thirty seconds. It is apparent that from fifteen to thirty seconds is too dangerously long a period of time in which to allow a vessel to run uncontrolled.

In detail, the construction illustrated in the drawings comprises an internal combustion engine 1 of the Diesel type, of which I have only illustrated a fragmentary portion. The part of the engine that I have illustrated consists of the crank case 2 and a cylinder 3, mounted on the crank case, and the engine fly wheel 4 rotatably mounted on the crank shaft of the engine. On an end of the engine crank case 2 I have mounted a bracket 5 having a pair of arms 6 and 7 extended out from a side thereof. Each of the arms 6 and 7 is provided with bearings 8 on the ends thereof.

A plate 9 connects a pair of "bell-cranks" 10 and 11, and each "bell-crank" 10 and 11, at the elbow thereof, is provided with a bearing 12. The bearings 12 are spaced apart to pass around and be engaged with the outer ends of the bearings 8 on the bracket 5. A shaft 13 is passed through the bearings 8 and 12 to support the "bell-cranks" 10 and 11 in pivotal relation on the arms 6 and 7. The arms 14 and 15 of each of the "bell-cranks" 10 and 11 are provided with aligned bearings 16 on the outer ends thereof. A shaft 17 is journaled in the bearings 16 and a brake shoe plate 18, having a pair of spaced bearings 19 on the upper face thereof, is pivotally supported on the shaft 17. The brake shoe plate 18 is curved on the same radius as the periphery of the face of the fly wheel 4 and the bottom face of the brake shoe plate 18 is faced with lining material 20. The brake shoe plate 18 is supported in a normally inoperative position over the periphery of the fly wheel 4, so that it may be applied into engagement therewith, to retard the rotation of said fly wheel.

The opposite arms 21 and 22 of the respective "bell-cranks" 10 and 11 are provided with bearings 23 and 24 thereon. A cylinder 25 is provided with a pair of hubs 26 and 27, on diametrically opposite sides thereof, to extend between the bearings 23 and 24 and be held in pivotal engagement therewith by the studs 28 and 29. An end of the cylinder 25 is provided with a piston rod bearing 30 thereon in concentric relation with the axis of said cylinder.

A piston 31 is reciprocatingly mounted within a cylinder 25 and the rod 32 on said piston extends out from the cylinder 25 through the bearing 30. The cylinder 25 is rotatably mounted on the upstanding arms 21 and 22 of the "bell-cranks" 10 and 11 respectively, and in order to maintain the axis of the cylinder 25 in a substantially horizontal position, I provide a plate 33, having a hole therein, through which the piston rod 32 extends, to hold said rod 32 in a substantially horizontal operating position. The plate 33 permits free reciprocating movement of the piston rod 32 but prevents said piston rod 32 from swinging out of a horizontal position. The end of the rod 32 is adapted to abutt against the side of the cylinder 3, or some other relatively stationary part of the engine. In order to balance the cylinder 25 and brake shoe 18, on the shaft 13, and to keep the brake shoe 18 out of contact with the fly wheel, I have extended an arm 34 from the rear side of the "bell-crank" 10 and provided a slot through the end of said arm. A bolt 35 extends through the slot in the end of the arm 34 and is secured to the bracket 5. A nut 36 is adjustably mounted on the upper end of the bolt 35 and an expansion spring 37 is confined between the nut 36 and the upper face of the arm 34. The tension of the spring 37 is sufficient to overbalance the weight of the cylinder 25 and brake shoe 18 to hold the said brake shoe 18 out of engagement with the fly wheel.

The piston 31 and the cylinder 25 are reciprocated relative to each other by air pressure conducted to said cylinder 25 through a conduit 40 that is connected to a port 41 on a valve 42. The valve 42 is provided with an inlet port 43 that is connected by a conduit 44 to a source of air pressure supply (not shown). A plunger 45 is slidably mounted within the valve 42, to separate the inlet port 43 from the port 41, said plunger being held in the closed position by a spring 46. The air pressure is automatically passed through the valve 42 by operating mechanism that is synchronized to function in timed relation with the engine operating apparatus. In Fig. 5 I have shown a lift rod 47 which controls the opening of the fuel supply nozzle into the engine cylinder, and which is operated by the engine cam shaft 48. The amount of lift imparted to the lift rod 47 regulates the degree of opening of the fuel nozzle and hence regulates the amount of fuel that will be injected into the engine cylinder. The amount of lift of the rod 47 is regulated by a wedge shaped member 49 that is pivotally mounted on the lower end of an arm 50 mounted on a control shaft 51. Rotation of the shaft 51 in opposite directions moves the wedge member 49 in or out relative to the lift rod 47, and hence either stops or starts the operation of the engine. On the end of the rod 51 I have provided an arm 52 which is adapted to engage a lever 53 that is pivotally mounted on the valve 42. When the engine has been operating and the operation thereof is stopped by withdrawing the wedges 49 from beneath the lift rods 47, the arm 52 on the control shaft 51 actuates the valve lever 53 in the direction of the arrow "A", causing the plunger 45 within the valve 42 to become unseated therein, and allows air pressure from the port 43 to pass by the plunger 45 and to enter the conduit 40 and to pass into the cylinder 25 and to cause reciprocation between the plunger and cylinder. The piston 31 and rod 32 remain stationary, due to the fact that the end of the plunger 32 is in engagement with a fixed part of the engine, and hence the air pressure admitted into the cylinder causes the cylinder 25 to be reciprocated relative to the piston. The sliding or reciprocating movement of the cylinder 25 through its pivotal connection with the "bell-crank" arms 10 and 11 causes the brake shoe 18 to be applied to the periphery of the fly wheel 4. The pressure with which the brake shoe 18 will be applied to the periphery of the fly wheel depends upon the pressure of air injected into the cylinder 25, to instantly apply the brake shoe 18 to the fly wheel and to bring the fly wheel to a dead stop within two or three seconds' time.

As soon as the engine operation, as well as the fly wheel, have become stopped by the braking apparatus, the control shaft 51 is turned so as to swing the arm 52 out of engagement with the valve lever 53. This action permits the plunger 45 in the valve to automatically seat itself and to shut off the air supply to the cylinder 25. The air pressure within the cylinder 25 and the conduit 40, then flows back into the valve 42 to raise the slidable head 54 in the valve 42 relative to the plunger 45, against the tension of the spring 55 to allow the spent air pressure to be exhausted out through the central opening 56 in the movable head 54. The movable head 54 and the plunger 45 in the said valve are related to each other so that on the down stroke of the plunger 45, to admit air into the cylinder 25, the movable head 54 in the valve contacts with and follows the movement of the plunger 45. When the pressure is being exhausted from the cylinder 25, said air pressure is sufficient to lift the movable head 54 away from contact with the plunger 45, for a period of time sufficient to exhaust said pressure, after which the movable head 54 and plunger 45 resume their normal contacting relationship.

Having thus described this invention, what I claim and desire to secure by Letters Patent is:

1. In combination a machine having a rotatable element thereon; a brake, to retard rotation of said element, pivotally mounted on the machine in relation to the element; resilient means on the machine to hold the brake out of contact with the rotatable element; and controllable means on the machine operatively connected to the brake to overcome the tension of the resilient means and to apply the brake to the rotatable element, said controllable means comprising a stationary piston, a cylinder reciprocatably mounted on said machine, said bell crank being pivotally connected at one end to the cylinder and at the opposite end to said brake.

2. In combination, a machine having a rotatable element thereon; a brake pivotally mounted adjacent the said element to retard rotation thereof; resilient means engaging the brake to hold the said brake out of contact with the rotatable element; a bracket mounted on said machine, a stationary piston, a reciprocatable cylinder mounted on said piston, a bell crank pivotally mounted in said bracket and pivotally connected at one end to said cylinder and operatively connected to said bracket at the opposite end.

3. In combination, a machine having a rotatable element thereon; a brake pivotally mounted adjacent the said element to retard rotation thereof; resilient means engaging the brake to hold the said brake out of contact with the rotatable element; a reciprocatable cylinder pivotally connected to the brake; and means to reciprocate the cylinder to apply the brake to the rotatable element, said means comprising a fluid conductor to said cylinder a valve interposed in said conductor; and means for operating said valve in timed relation to operating the machine.

4. In combination, a machine having a rotatable element thereon; a brake pivotally mounted adjacent the said element to retard rotation thereof; resilient means engaging the brake to hold the said brake out of contact with the rotatable element; a stationary piston mounted on said machine; a reciprocatable cylinder mounted on said piston; a bracket mounted on said machine; a pair of bell cranks pivotally mounted in said bracket on opposite sides of said cylinder, said bell cranks being pivotally connected to opposite sides of said cylinder at one end and the other end being pivotally connected to said brake.

5. In combination, a machine having a rotatable element thereon; a "bell-crank" pivotally mounted on said machine; a brake shoe, pivotally mounted on an end of the "bell-crank", to be engaged with the rotatable element; resilient means engaging the "bell-crank" to hold the brake out of contact with the rotatable element; a reciprocatable cylinder pivotally connected to the other end of the "bell-crank" and movably related to a stationary part of the machine; and means to reciprocate the plunger relative to the machine to apply the brake to the rotatable element.

6. In combination, a machine having a rotatable element thereon; a "bell-crank" pivotally mounted on said machine; a brake shoe, pivotally mounted on an end of the "bell-crank" to be engaged with the rotatable element; resilient means engaging the "bell-crank" to hold the brake out of contact with the rotatable element; a cylinder pivotally mounted on the other end of the "bell-crank"; and a pneumatically actuated plunger reciprocatingly mounted in the cylinder and movable relative to a stationary part of the machine to overcome the tension of the resilient means to apply the brake to the rotatable element.

In testimony whereof, I have hereunto set my hand at San Francisco, California, this 27th day of June, 1927.

JOHN W. LORIMER.